United States Patent
de Ledebur et al.

(10) Patent No.: US 11,834,297 B1
(45) Date of Patent: Dec. 5, 2023

(54) ADJUSTABLE SEAL

(71) Applicants: Juan Carlos G. de Ledebur, Key Biscayne, FL (US); Carlos M. Ascua, Entre Rios (AR)

(72) Inventors: Juan Carlos G. de Ledebur, Key Biscayne, FL (US); Carlos M. Ascua, Entre Rios (AR)

( * ) Notice: Subject to any disclaimer, the term of this patent is extended or adjusted under 35 U.S.C. 154(b) by 0 days.

(21) Appl. No.: 18/319,917

(22) Filed: May 18, 2023

(51) Int. Cl.
*B66B 11/02* (2006.01)
*F16J 15/3284* (2016.01)
*B66B 9/04* (2006.01)

(52) U.S. Cl.
CPC ........ *B66B 11/0226* (2013.01); *F16J 15/3284* (2013.01); *B66B 9/04* (2013.01)

(58) Field of Classification Search
CPC ...... B66B 11/0226; B66B 9/04; F16J 15/3284
See application file for complete search history.

(56) References Cited

U.S. PATENT DOCUMENTS

| | | | | |
|---|---|---|---|---|
| 1,578,723 A | * | 3/1926 | Fellows | B65G 51/06 406/190 |
| 3,066,761 A | * | 12/1962 | Behrens | B66B 5/18 187/400 |
| 3,949,953 A | * | 4/1976 | Hopkins | B65G 51/06 406/185 |
| 5,447,211 A | * | 9/1995 | Sors | B66B 9/04 187/277 |
| 10,233,055 B1 | * | 3/2019 | Ascua | B66B 11/026 |
| 10,351,388 B2 | | 7/2019 | Ascua et al. | |

FOREIGN PATENT DOCUMENTS

CN 111170112 A * 5/2020 ........... B66B 1/3415

* cited by examiner

*Primary Examiner* — Diem M Tran
(74) *Attorney, Agent, or Firm* — Christopher & Weisberg, P.A.

(57) ABSTRACT

An elevator cabin seal for an elevator is described. The elevator cabin seal includes a plate having a plate interior surface, a seal member, and a plurality of adjustment members. The seal member has a seal member interior surface and a seal member top surface contiguous with the seal member interior surface. The seal member top surface is coupled to the plate interior surface. Each adjustment member of the plurality of adjustment members is coupled to the plate interior surface and contacts the seal member interior surface to exert an adjustable force against the seal member interior surface.

14 Claims, 13 Drawing Sheets

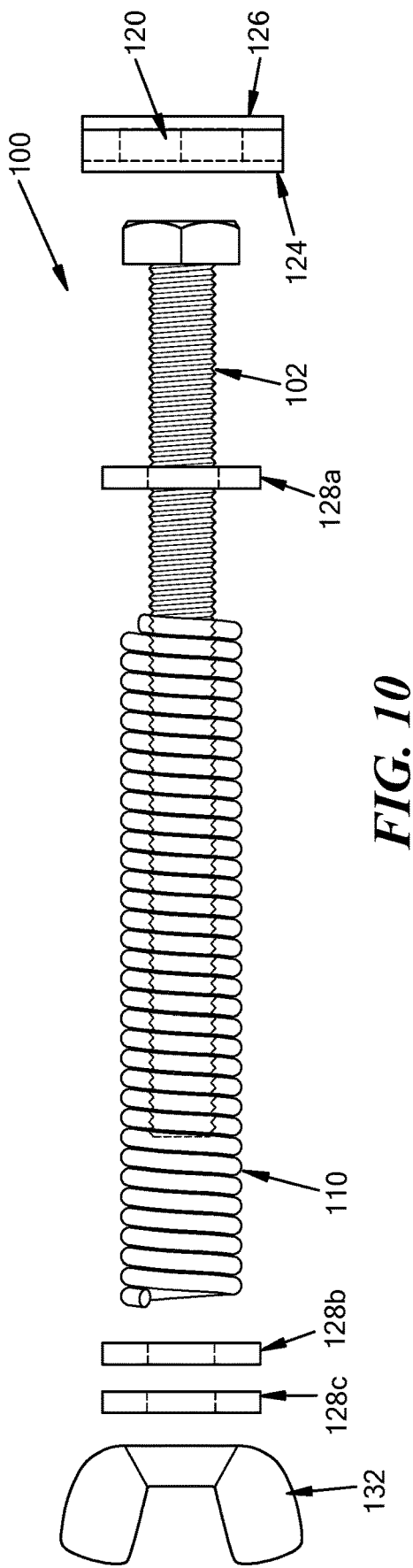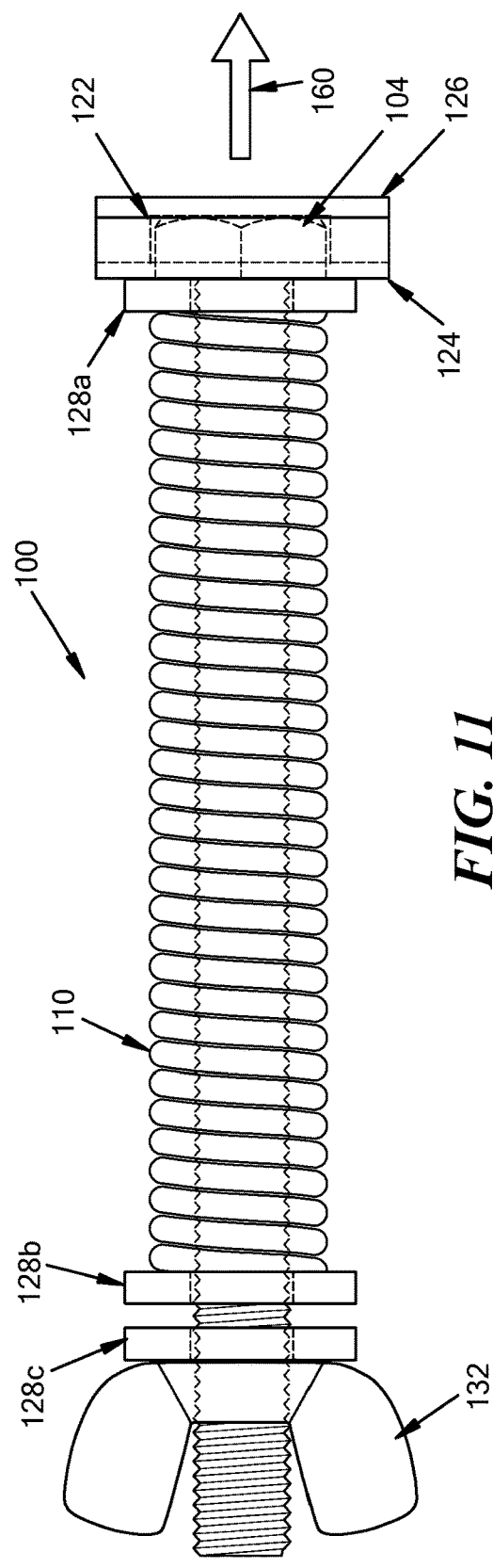
FIG. 10
FIG. 11

ADJUSTABLE SEAL

TECHNICAL FIELD

The present technology is generally related to sealing features of vacuum elevators, more specifically related to adjustable seals for isolating sections of vacuum elevators.

BACKGROUND

Elevators are typically used to transport people and goods between two or more floor levels of a building, house, ship, etc. Elevators may comprise a cabin (i.e., car) that is generally used to transport the people and goods between floors. When the cabin is put in motion, the cabin travels within an unobstructed space. The unobstructed space may be referred to as elevator well. The elevator well and the cabin may comprise one or more elements of the elevator system, e.g., depending on the type of elevator. Some examples of elevator technologies include traction elevators, hydraulic elevators, and vacuum elevators. Traction elevators require the use of cables, motors, weights, etc. Hydraulic elevators require the use of complex hydraulic systems including pistons, hydraulic fluid, hydraulic pumps, etc. Generally, vacuum elevators do not require the complexity of traction and hydraulic elevators.

More specifically, a vacuum elevator may have a cabin that travels up and down an outer structure using rails and guides. To move the cabin upwards, a vacuum system is used. The vacuum system extracts air from the unobstructed space above the cabin, thereby creating a vacuum or a low pressure space. The difference between the pressure of air above the cabin and the pressure of air below the cabin forces the elevator to move upwards. Typically, the downwards movement of the vacuum elevator relies on gravity (i.e., without the use of the vacuum system). To create the suction, the elevator (e.g., comprising the unobstructed space and cabin) is sealed to prevent air leaks. The seal (e.g., air-tight seal) plays an important role in controlling the ascent and descent. Further, creating a reliable seal in a vacuum elevator is essential to the safety of the elevator.

Although air should only be suctioned from the space above the cabin, conventional seals create air pockets and air leaks around the top of the cabin that allow air other than the air above the cabin to be suctioned. The air pockets and/or air leaks cause the cabin to experience unintended and undesirable jumps and jerks.

SUMMARY

The techniques of this disclosure generally relate to adjustable sealing features of an elevator cabin seal associated with a vacuum elevator.

Some embodiments provide an elevator cabin seal that is adjustable (i.e., an adjustable seal). In some embodiments, the elevator cabin seal includes a plate and a seal member (e.g., made of silicon, made of a material having one or more characteristics of silicone, etc.). In some other embodiments, the seal member is arranged to press an internal surface of the elevator (e.g., internal surface of the walls of the space where the elevator travels). The internal surface may be of polycarbonate, such as in a cylindrical vacuum elevator. The elevator cabin seal may be arranged to have its position (e.g., with respect to the internal surface of the elevator) adjusted. In some embodiments, at least a portion of the elevator cabin seal is expanded or contracted such as to control the sealing features. In some embodiments, the adjustment offers an option of pressing the seal into the internal surface of the elevator, thereby eliminating any air leaks and/or pockets that may exist.

In some embodiments, an air-tight seal around the ceiling structure of the cabin is created by the elevator cabin seal. When turbines are turned on to begin the suction process, the only air that is exhaled is the air from the top of the cabin to the roof of the elevator, i.e., ensuring no air from the seal down is being suctioned.

In some embodiments, the elevator is a cylindrical elevator which has a space contained at least in part by polycarbonate panels. The elevator cabin seal (e.g., positioned on the top portion of the cabin) is in contact with the polycarbonate panels. The seal member of the elevator cabin seal may serve as a buffer between the plate and the polycarbonate panels, allowing for a smooth ride up and down the elevator. The seal member may be coupled (e.g., attached) to the plate, e.g., using liquid silicone. The seal member may have an L-shape which may further facilitate coupling the seal member to the plate. At least a portion of the seal member (e.g., the overhang) contacts and/or slides against the polycarbonate panels.

One or more embodiments provide adjustment of the elevator cabin seal such as to eliminate air pockets. For example, conventional seals have a risk of being damaged or deformed during manufacturing, transport, and/or use. The damage and/or deformation may create the air pockets around the ceiling of the cabin in the elevator (e.g., by the conventional seals). As a result of the air pockets, the ride in the elevator may not be smooth and/or experience jumps and jerks in the areas where the air pockets are. Further, a whistling noise also arises where the air pockets are formed. The noise along with the jumps and jerks may result in an unpleasant experience. By using the elevator cabin seal of the present disclosure, the elevator cabin seal can be adjusted such that air pockets are at least minimized.

In one aspect, the present disclosure provides an elevator cabin seal for an elevator. The elevator cabin seal includes a plate having a plate interior surface, a seal member, and a plurality of adjustment members. The seal member has a seal member interior surface and a seal member top surface contiguous with the seal member interior surface. The seal member top surface is coupled to the plate interior surface. Each adjustment member of the plurality of adjustment members is coupled to the plate interior surface and contacts the seal member interior surface to exert an adjustable force against the seal member interior surface.

In another aspect, the disclosure provides another elevator cabin seal for an elevator. The elevator cabin seal includes a plate having a plate interior surface, a seal member, a plurality of brackets, and a plurality of adjustment members. The seal member has a seal member interior surface and a seal member top surface contiguous with the seal member interior surface. The seal member top surface is coupled to the plate interior surface. Each bracket of the plurality of brackets is coupled to the plate interior surface. Each adjustment member of the plurality of adjustment members is coupled to a corresponding bracket of the plurality of brackets and contacts the seal member interior surface to exert an adjustable force against the seal member interior surface.

In one aspect, the disclosure provides an elevator. The elevator includes a cylindrical wall forming an internal space and a cabin within the internal space. The cabin includes a cabin top portion and an elevator cabin seal coupled to the cabin top portion. The elevator cabin seal includes a plate, a seal member, a plurality of brackets, and a plurality of adjustment members. The plate has a plate interior surface. The seal member has a seal member interior surface, a seal member exterior surface, and a seal member top surface contiguous with the seal member interior surface and the seal member exterior surface. The seal member top surface is coupled to the plate interior surface. Each bracket of the plurality of brackets is coupled to the plate interior surface. Each adjustment member of the plurality of adjustment members is coupled to a corresponding bracket of the plurality of brackets and contacting the seal member interior surface to exert an adjustable force against the seal member interior surface. At least a portion of the seal member exterior surface contacts and presses against the cylindrical wall when the adjustable force is exerted against the seal member interior surface.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 10 shows a side view of an example adjustment member according to one or more embodiments of the present disclosure;

FIG. 11 shows another side view of an example adjustment member according to one or more embodiments of the present disclosure;

DETAILED DESCRIPTION

Figure 1:
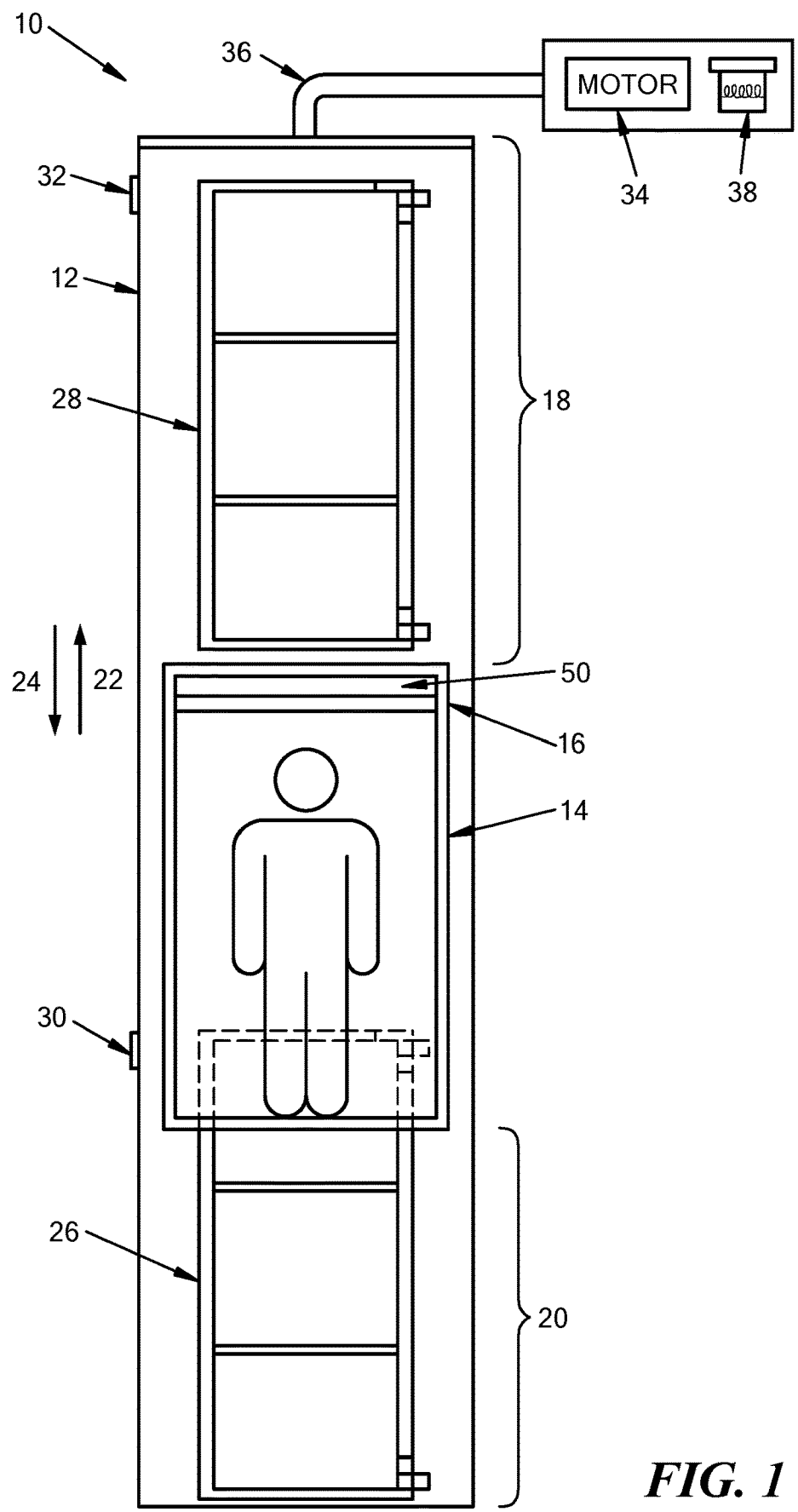
FIG. 1 shows an example elevator (e.g., elevator system) according to one or more embodiments of the present disclosure.

Before describing in detail exemplary embodiments, it is noted that the embodiments reside primarily in combinations of apparatus components and processing steps related to an adjustable seal (e.g., elevator cabin seal). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments described herein, the term "coupled," "connected," "attached" and the like, may be used herein to indicate a coupling of two or more elements or components, although not necessarily directly. It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, an elevator.

Referring now to the drawing figures in which like reference designators refer to like elements, FIG. 1 shows an example elevator 10 (e.g., elevator system) including elevator cabin seal 50 constructed in accordance with the principles of the present invention. Elevator 10 may include one or more components such as elevator walls 12, cabin 14, cabin top portion 16, top space 18, bottom space 20, first floor door 26, second floor door 28, first floor sensor 30, second floor sensor 32, motor 34, pipe 36, valve 38, and elevator cabin seal 50. More specifically, elevator 10 is arranged such that cabin 14 moves up in ascent direction 22 and moves down in descent direction 24. The elevator walls 12 form an internal space comprised at least by cabin 14, top space 18, and bottom space 20. Motor 34 may be arranged as a turbine that evacuates air from the internal space (e.g., top space 18) via pipe 36. The motor 34 may use valve 38 (e.g., to control suction, vacuum, etc.). To move the cabin in the ascent direction 22, motor 34 is energized and air from the top space 18 is evacuated, i.e., suctioned, out to the exterior of elevator 10. The suction creates an air pressure in top space 18 that is lower than the air pressure in bottom space 20. The pressure differential causes cabin 14 to move in the ascent direction 22. Cabin 14 may be arranged to descend in the descent direction 24 by gravity (e.g., without the use of motor 34, suction, vacuum, etc.).

First and second floor sensors 30, 32 are configured to detect that cabin 14 has reached the first and the second floors, respectively. First and second floor doors 26, 28 are coupled (e.g., sealed to) elevator walls 12 and arranged to open to allow elevator passengers to enter and exit cabin 14, and to close to operate cabin 14 (e.g., ascend, descend). In some embodiments, elevator 10 and elevator walls 12 (and/or cabin 14, and/or first and second floor doors 26, 28) are cylindrical. However, elevator 10 (and/or any of its components) are not limited as such and may have any shape.

Further, in conventional systems, when motor 34 is energized, the suction created by motor 34 may create air pockets proximate to cabin top portion 16 (e.g., sealing functions of cabin ceiling assembly are compromised), which may cause cabin 14 to experience bumps, and jumps when ascending (or descending). Elevator cabin seal 50 is adjustable as described herein and is arranged to perform one or more sealing functions described herein such as contact (and press against) elevator walls 12 and seal at least cabin top portion 18 to the elevator walls 12.

Figure 2:
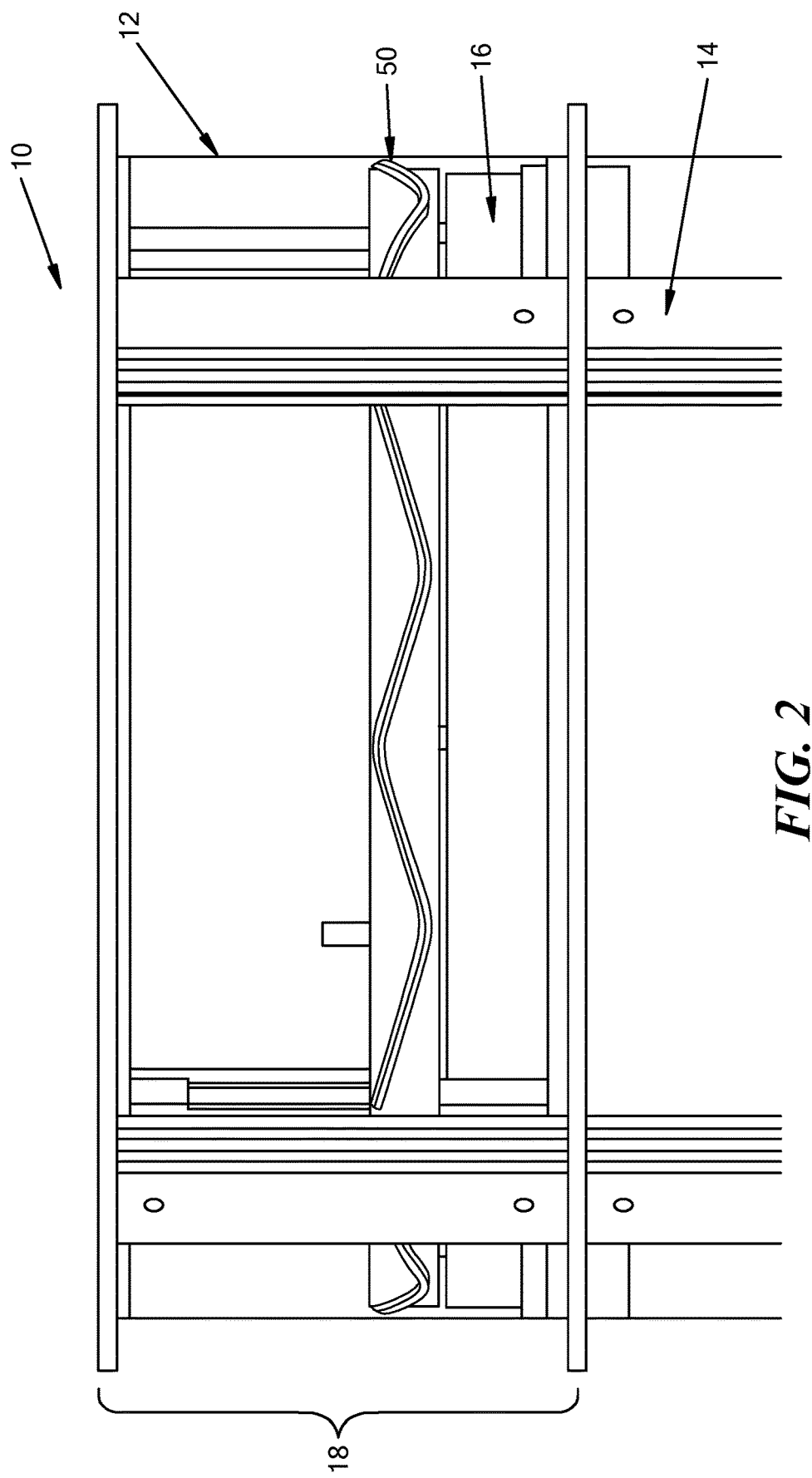
FIG. 2 shows a section of the example elevator according to one or more embodiments of the present disclosure.

FIG. 2 shows a section of elevator 10. Cabin top portion 16 is coupled to elevator cabin seal 50 (e.g., adjustable seal). Elevator cabin seal 50 is arranged to contact (and press against) elevator walls 12, thereby providing sealing features such that when cabin 14 is being operated to ascend and/or descend air pockets are not formed proximate to the cabin top portion 16 and/or elevator cabin seal 50. The sealing features are provided while the cabin is stationary and/or in motion. In some embodiments, only air from top space 18 is suctioned, i.e., no air is suctioned from other spaces such as cabin 14, bottom space 20, etc. In some other embodiments, elevator cabin seal 50 is arranged to press against elevator walls 12 and be adjustable such that when there is a gap between elevator cabin seal 50 and elevator walls 12, the gap is closed by adjusting the pressing force exerted by elevator cabin seal 50 to the elevator walls 12. In some embodiments, elevator cabin seal 50 is arranged to close more than one gap, i.e., multiple points of adjustment are provided to create the sealing features around the elevator cabin seal 50.

Figure 3:
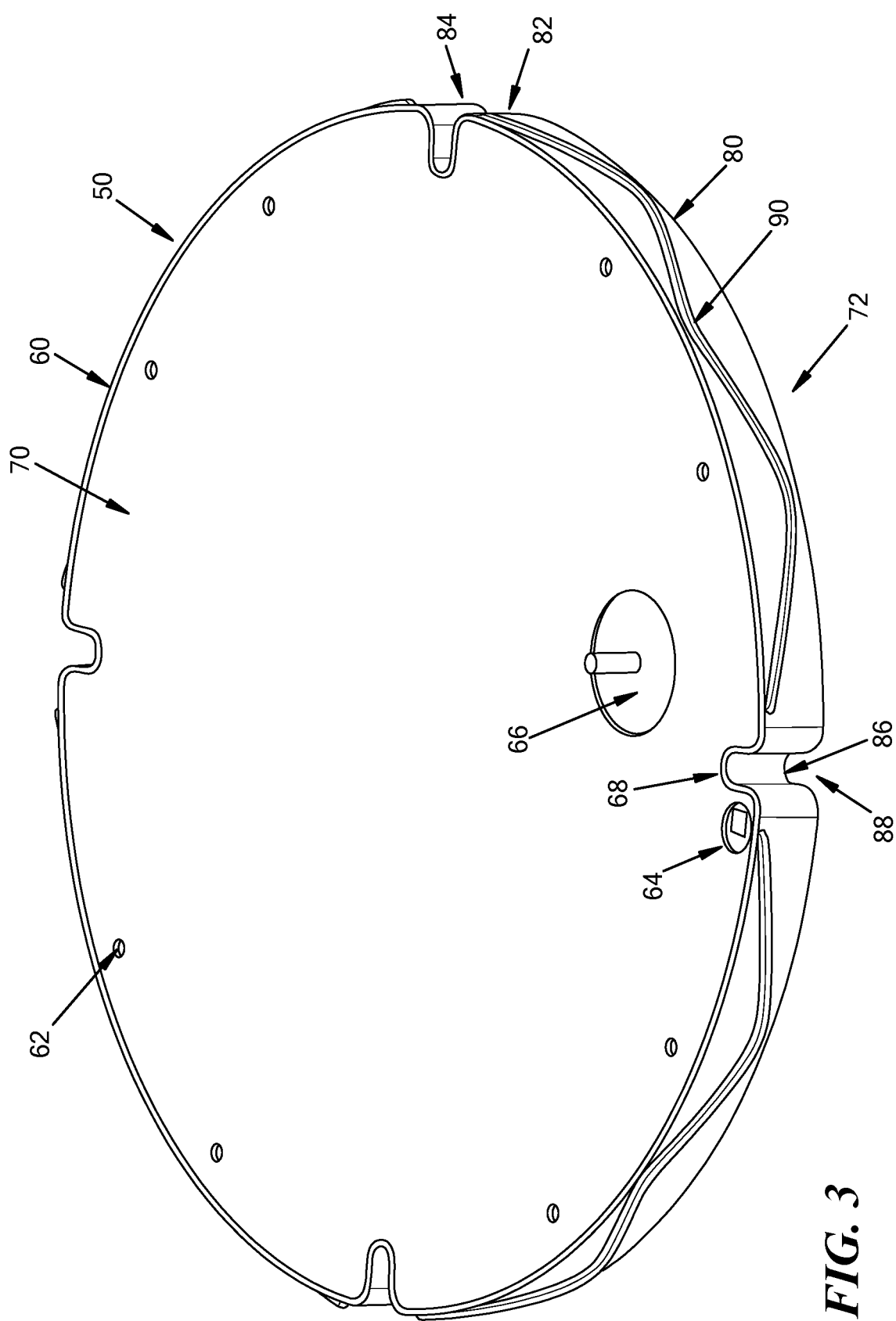
FIG. 3 shows an example elevator cabin seal according to one or more embodiments of the present disclosure.

FIG. 3 shows an example elevator cabin seal 50. Elevator cabin seal 50 may include plate 60 and seal member 80. Plate 60 may comprise one or more couplers 62, e.g., arranged to couple plate 60 to seal member 80 such as through corresponding openings on plate 60. The couplers 62 may be arranged to further provide sealing features (i.e., prevent air from being suctioned through the corresponding openings on plate 60). In some embodiments, another opening 64 may be provided which may be arranged to provide one or more functions such as access functions, sealing functions, etc. In an embodiment, opening 64 receives a travel cable of elevator 10, which connects cabin 14 to a main control box. In some embodiments, plate 60 includes a valve 66. Valve 66 may be a check valve and/or be arranged to release air from an interior of elevator cabin seal 50 and/or cabin 14 to top space 18.In some embodiments, when cabin 14 reaches to top of the elevator, a pin attached on top of valve 66 contacts the top portion of elevator 10 (or roof) which causes valve 66 to open (e.g., a predetermined percentage) to reduce pressure and facilitate the downwards trajectory of the cabin 14. Further, plate 60 may comprise plate connectors 68 (e.g., U-shaped), which may be configured to receive a column from elevator 10 (e.g., hug the column). Plate 60 may have a plate exterior surface 70 (e.g., directly exposed to top space 18) and plate interior surface 72 (e.g., exposed to, directly/indirectly coupled to cabin top portion 16).

Elevator cabin seal 50 further includes seal member 80 coupled to plate 60 (e.g., to interior surface 72 via one or more couplers 62). Seal member may have seal member exterior surface 82 and a seal member interior surface 84 opposite to seal member exterior surface 82. Further, seal member 80 may comprise one or more seal member connectors 86 (e.g., aligned with plate connectors 68) such as to create elevator cabin seal connectors 88 which may be configured to receive corresponding columns of elevator 10. Further, seal member 80 may comprise bumper 90 (coupled to seal member exterior surface 82) arranged to provide a friction and/or a seal between the elevator walls 12 and elevator cabin seal 50. In some embodiments, a material layer (e.g., cloth) is positioned such as between bumper 90 and seal member exterior surface 82. In some embodiments, the material layer is a cloth material that wraps the entire outer border of seal member 80. In some other embodiments, the material layer wraps over and under seal member 80 (e.g., a silicone-like material).

Figure 4:
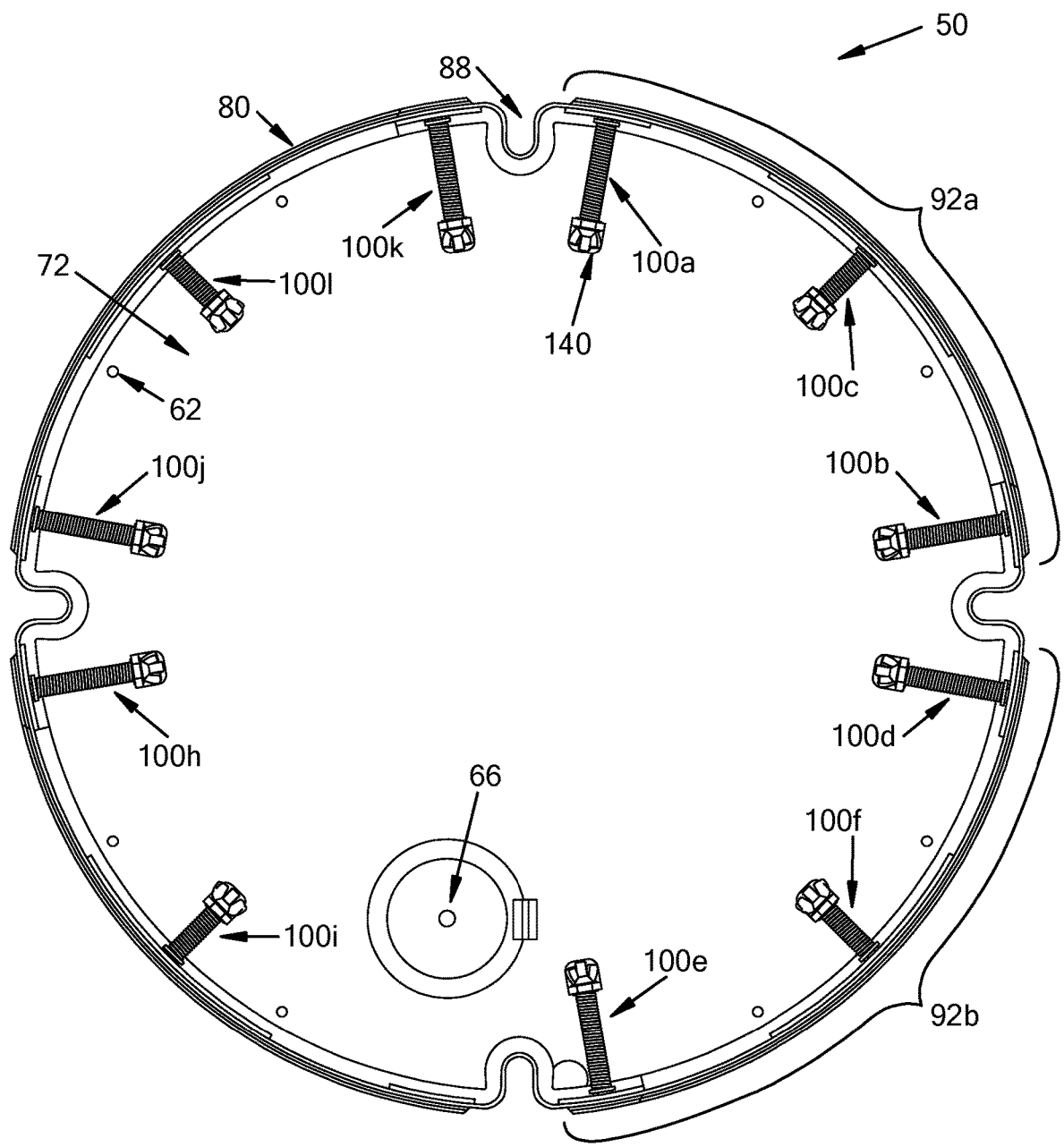
FIG. 4 shows a bottom view of an example elevator cabin seal according to one or more embodiments of the present disclosure.

FIG. 4 shows a bottom view of an example elevator cabin seal 50. Elevator cabin seal comprises a plurality of adjustment members 100. More specifically, adjustment members 100*a*, 100*b*, 100*c*, 100*d*, 100*e*, 100*f*, 100*h*, 100*i*, 100*j*, 100*k*, 100*l* are shown and are collectively referred to herein as "adjustment members 100"). Each adjustment member 100 is coupled to plate interior surface 72 (e.g., via a bracket 140) and coupled to seal member 80. Thus, elevator cabin seal 50 provides adjustable sealing at a plurality of areas around elevator cabin seal 50, e.g., areas where gaps are found, etc. That is, the shape and circumference (or perimeter) of elevator cabin seal is adjustable such as to eliminate gaps between the elevator cabin seal 50 and elevator walls 12. For example, a first sector 92*a* of seal member 80 may be pushed outward where the radius of the sector is increased by a first predetermined radius differential, and a second sector 92*b* of seal member 80 may be pushed outward by a second predetermined radius differential that is less than the first predetermined radius differential. Thus, the size and shape of elevator cabin seal 50 may be changed per sector 92 (or any other portion of the elevator cabin seal 50).

Figure 5:
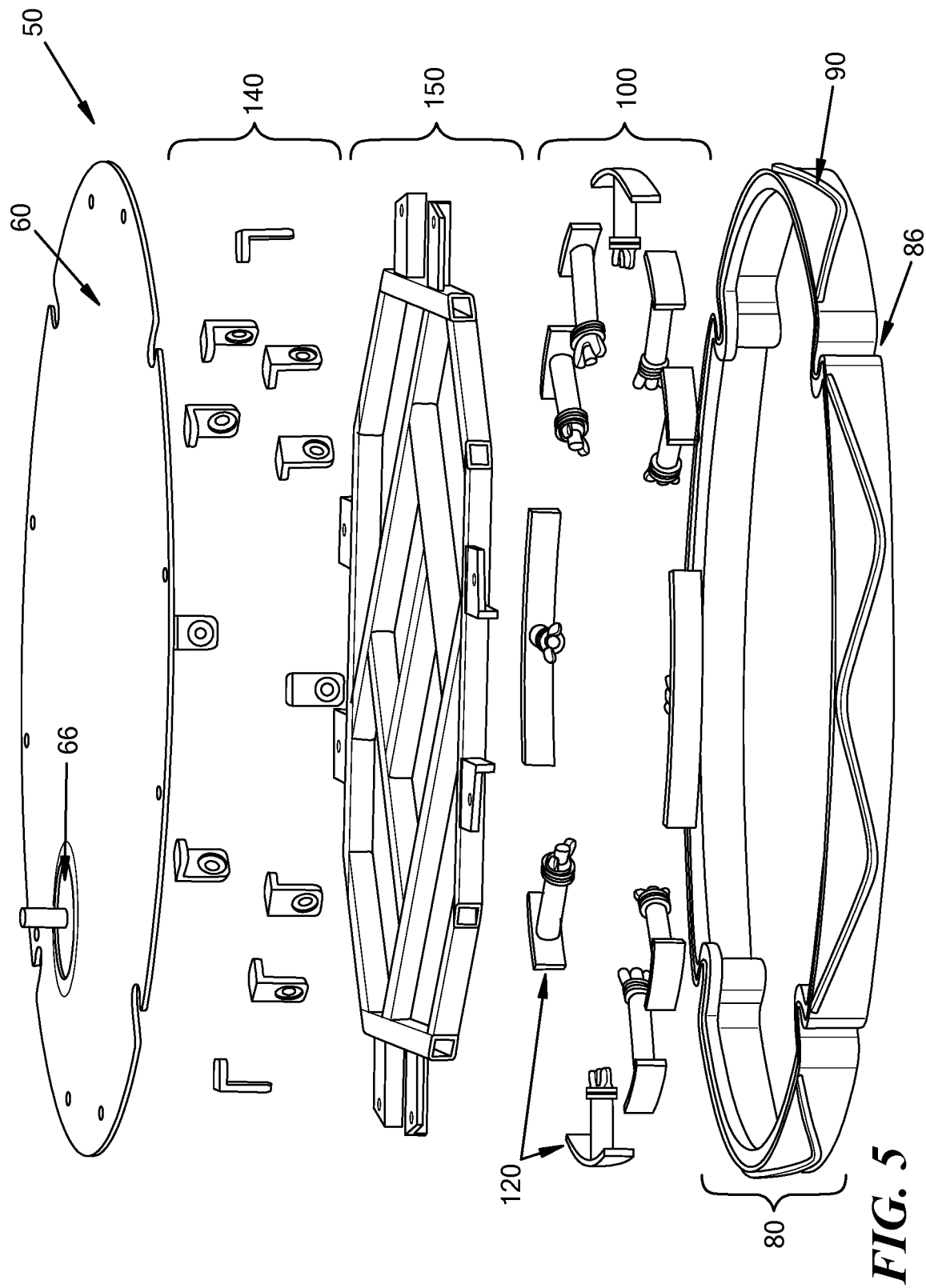
FIG. 5 shows an exploded view of an example elevator cabin seal according to one or more embodiments of the present disclosure.
Figure 6:
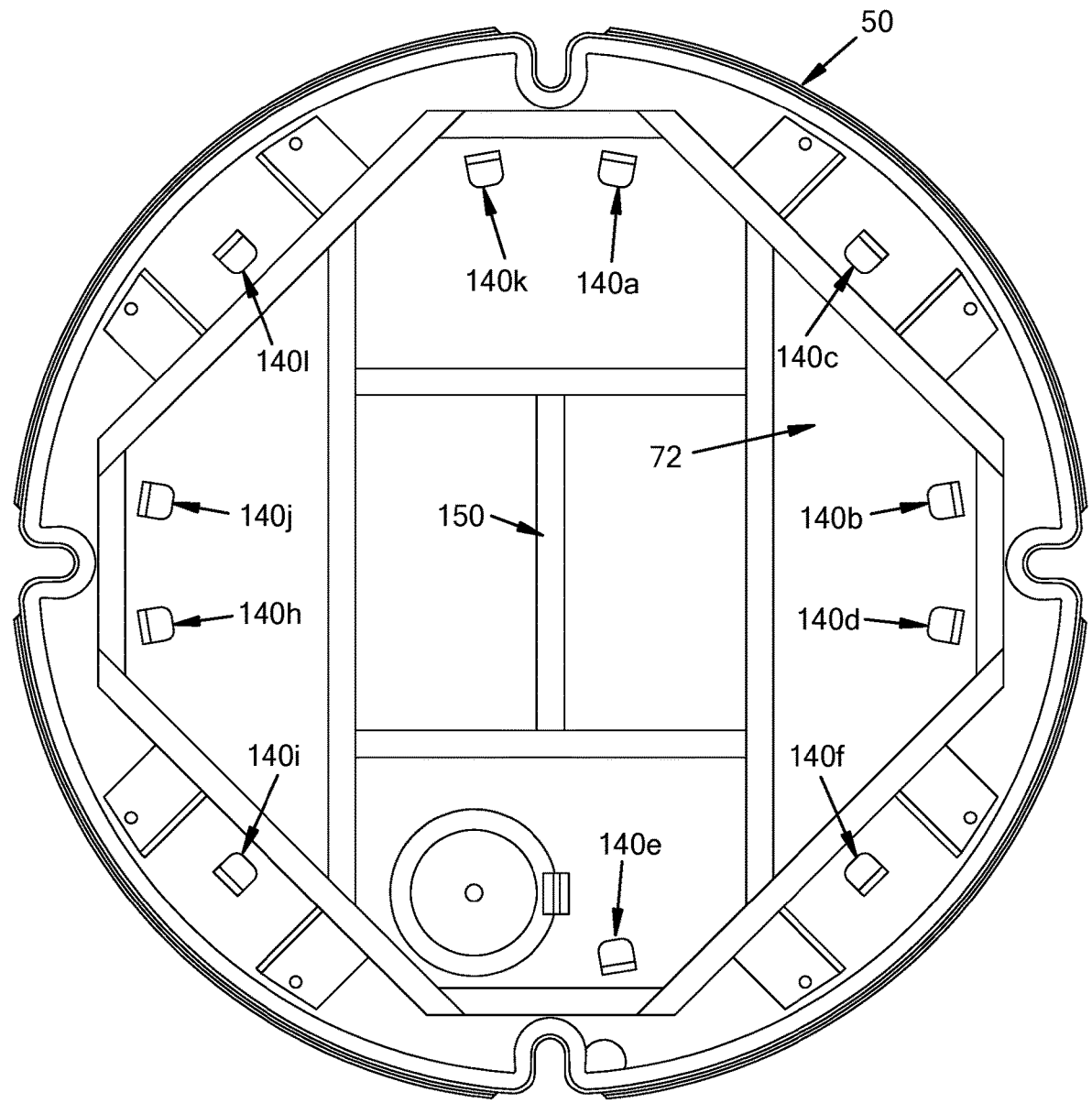
FIG. 6 shows a bottom view of an example elevator cabin seal comprising a plurality of brackets according to one or more embodiments of the present disclosure.
Figure 7:
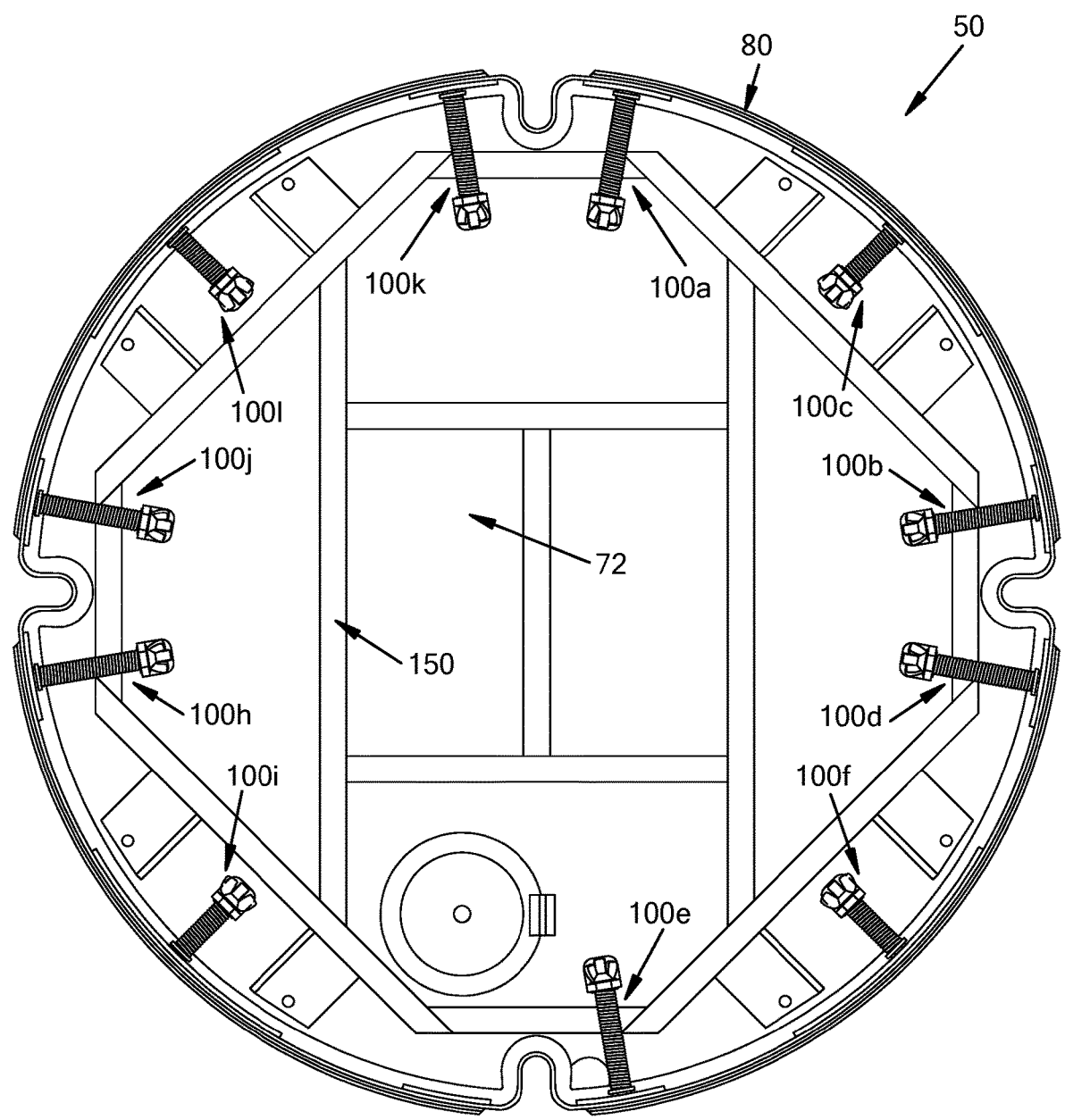
FIG. 7 shows a bottom view of the elevator cabin seal, further including a plurality of adjustment members according to one or more embodiments of the present disclosure.

FIG. 5 shows an exploded view of an example elevator cabin seal 50, which may comprise plate 60, valve 66, plate connector 68, brackets 140, frame 150, adjustment members 100, seal member 80 (comprising seal member connector 86 and bumper 90). FIG. 6 shows a bottom view of elevator cabin seal 50 comprising a plurality of brackets 140 (e.g., brackets 140*a*-140*l*, which are collectively referred to herein as "brackets 140") coupled to plate interior surface 72, and frame 150 coupled to plate interior surface 72. In some embodiments, frame 150 is the structure beneath the cabin roof plate and may be arranged to keep the plate in a uniform shape all throughout the suction process of the elevator. In some other embodiments, frame 150 prevents the plate from buckling in predetermined conditions such as when the suction process begins, is ongoing, or ends. FIG. 7 shows a bottom view of the elevator cabin seal 50 of FIG. 6, further including a plurality of adjustment members 100 (e.g., 100a-100l) attached to their corresponding bracket 140 and seal member 80. In a nonlimiting example, adjustment members 100a, 100b, 100d, 100e, 100h, 100j, 100k are edge adjustment members, and adjustment members 100c, 100f, 100i, 100l are middle adjustment members.

Figure 8:
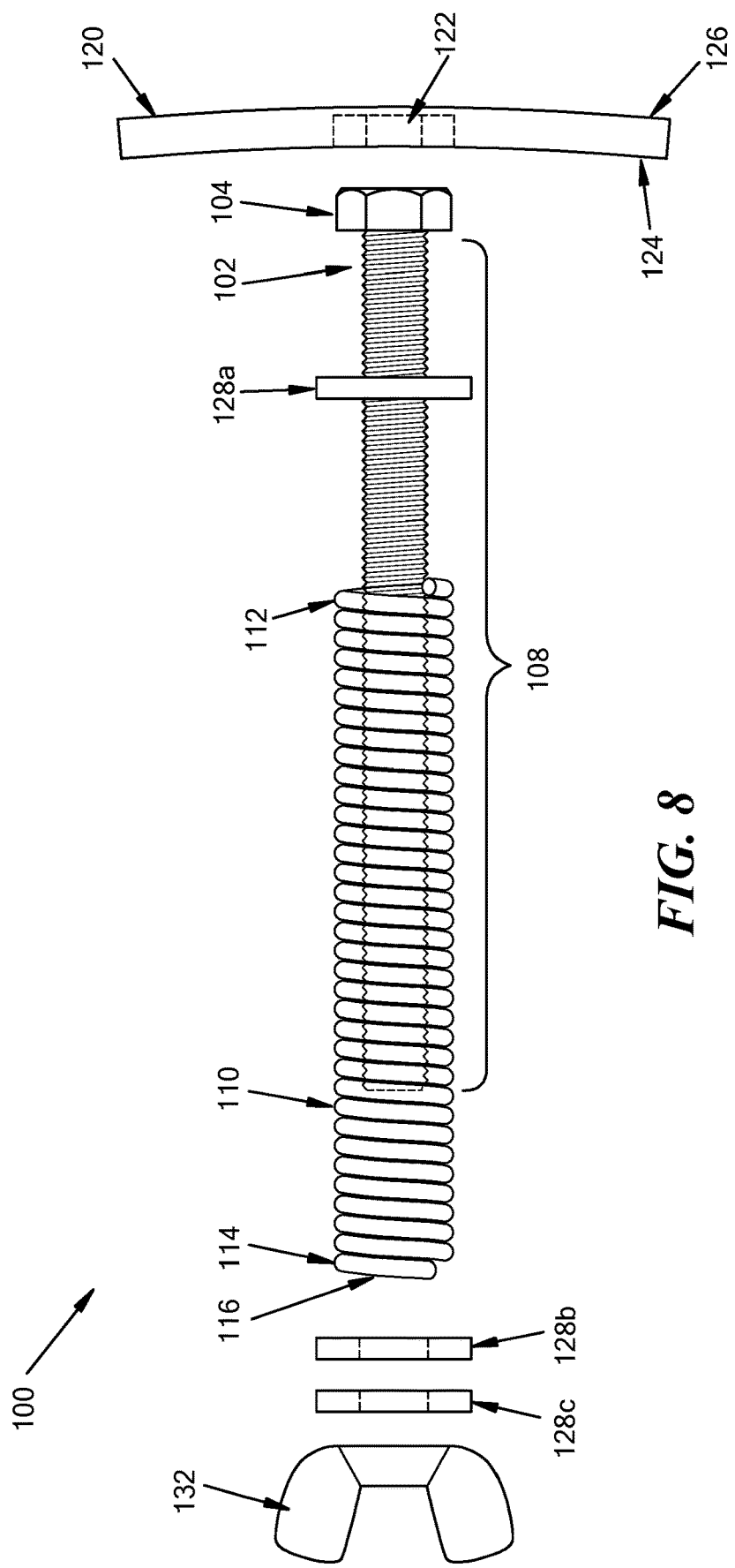
FIG. 8 shows a top view of an example adjustment member of an elevator cabin seal according to one or more embodiments of the present disclosure.

FIG. 8 shows a top view of an example adjustment member 100 of elevator cabin seal Adjustment member 100 may comprise one or more of a bolt 102, spring 110, push plate 120, washers 128, and nut 132. More specifically, spring 110 may have first spring end 112, a second spring end 114 opposite first spring end 112, and a spring interior 116. Bolt 102 may be positioned within spring interior 116. In some embodiments, washers 128 may be used, e.g., washer 128a is positioned between bolt head 104 and first spring end 112, and washers 128b, 128c are positioned between second spring end 114 and nut 132 (washers 128a, 128b and 128c are collectively referred to herein as "washers 128"). Further, push plate 120 may comprise a cavity 122 which may be arranged to receive a portion of bolt 102, e.g., bolt head 104. In some embodiments, bolt head 104 is coupled to cavity 122, e.g., welded. In some other embodiments, cavity 122 is shaped to conform to the shape of bolt head 104. In some embodiments, bolt head 104 is coupled to push plate 120, e.g., push plate 120 does not comprise cavity 122. Further, bolt 102 may comprise a bolt threaded portion 108, e.g., extending from bolt tail 106 towards bolt head 104. Bolt threaded portion 108 may be arranged to receive nut 132 to provide fastening features using at least the bolt threaded portion 108 and a nut threaded portion.

Figure 9:
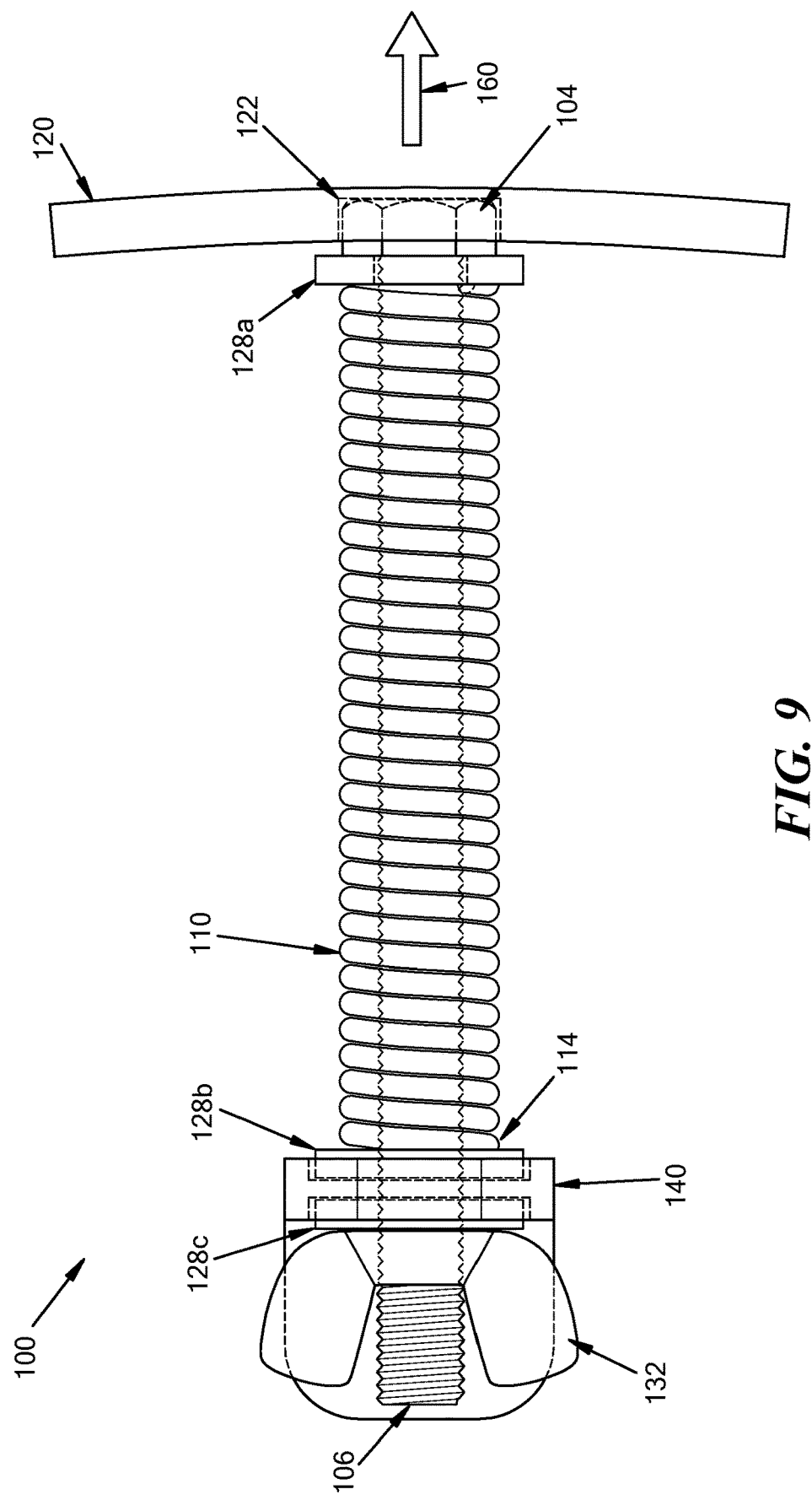
FIG. 9 shows another top view of the example adjustment member according to one or more embodiments of the present disclosure.
Figure 12:
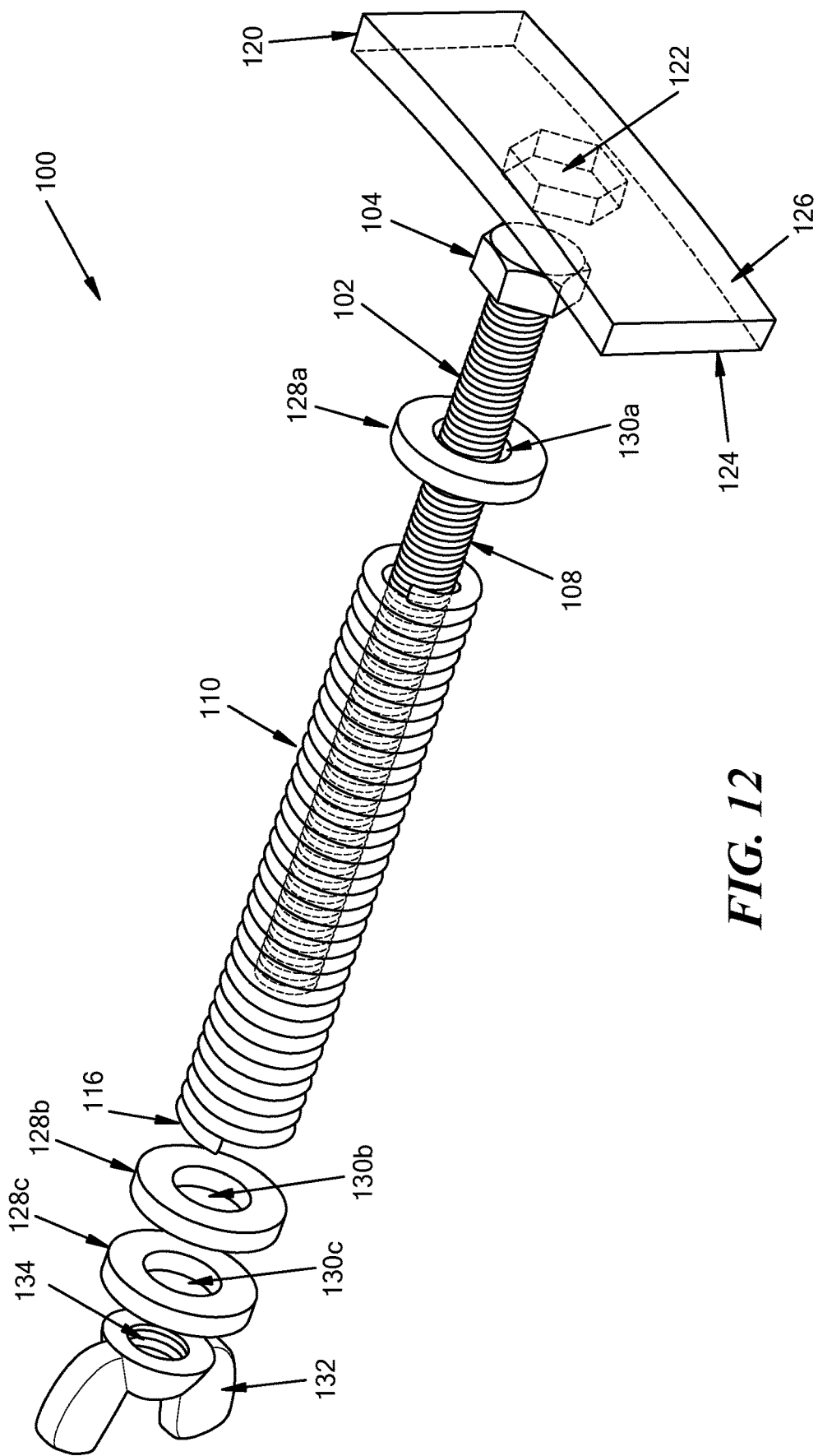
FIG. 12 shows a perspective view of an example adjustment member according to one or more embodiments of the present disclosure.
Figure 13:
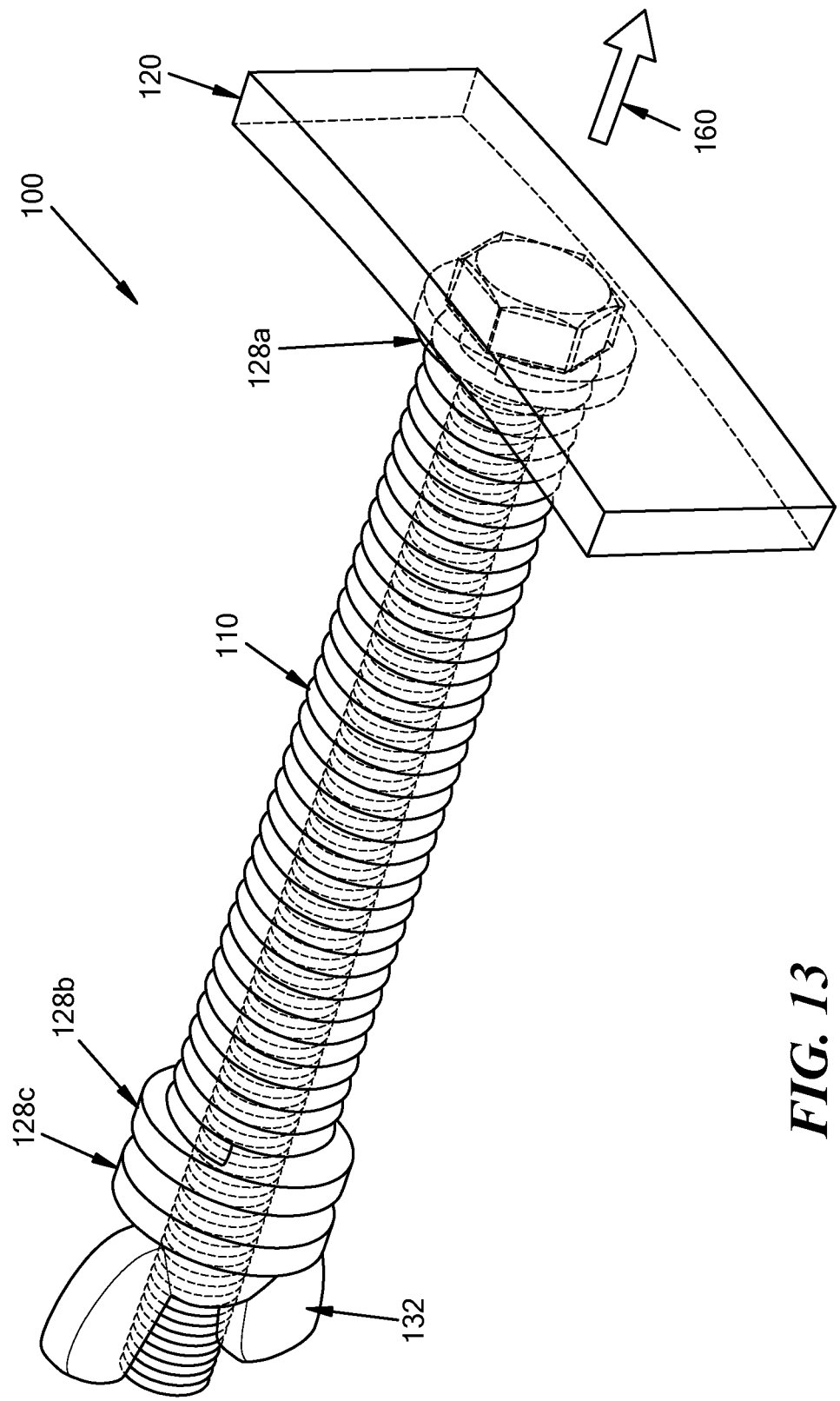
FIG. 13 shows another perspective view of an example adjustment member according to one or more embodiments of the present disclosure.

FIG. 9 shows a top view of the example adjustment member 100 of FIG. 8 after fastening nut 132 at bolt tail 106. A bracket 140 is positioned between spring 110 and nut 132 (e.g., in between washers 128b, 128c). Bolt 102 is coupled to push plate 120 (e.g., at cavity 122) and nut 132 is fastened. Tightening nut 132 at bolt tail 106 increases the force that spring 110 exerts to push plate 120 (and bracket 140, which is coupled to elevator cabin seal 50). Loosening nut 132 decreases the force that spring 110 exerts to push plate 120 (and bracket 140, which is coupled to elevator cabin seal 50). Put differently, adjusting the position of nut 132 adjusts force 160 (e.g., force value) that is applied by adjustment member 100 at least via push plate 120, e.g., to create sealing features between elevator cabin seal 50 and elevator walls 12. FIG. 10 shows a side view of the example adjustment member 100 of FIG. 8, and FIG. 11 shows a side view of the example adjustment member 100 of FIG. 9. FIG. 12 shows a perspective view of the example adjustment member 100 of FIG. 8, where washer openings 130a, 130b, 130c of washers 128a, 128b, 128c, respectively, are shown. Nut 132 comprises nut threaded portion 134 which may engage bolt threaded portion 108. A first push plate surface area 124 and a second push plate surface 126 are shown. FIG. 13 is a perspective view of the example adjustment member 100 of FIG. 9, e.g., after fastening nut 132 which causes force 160 to be exerted by push plate 120.

Figure 14:
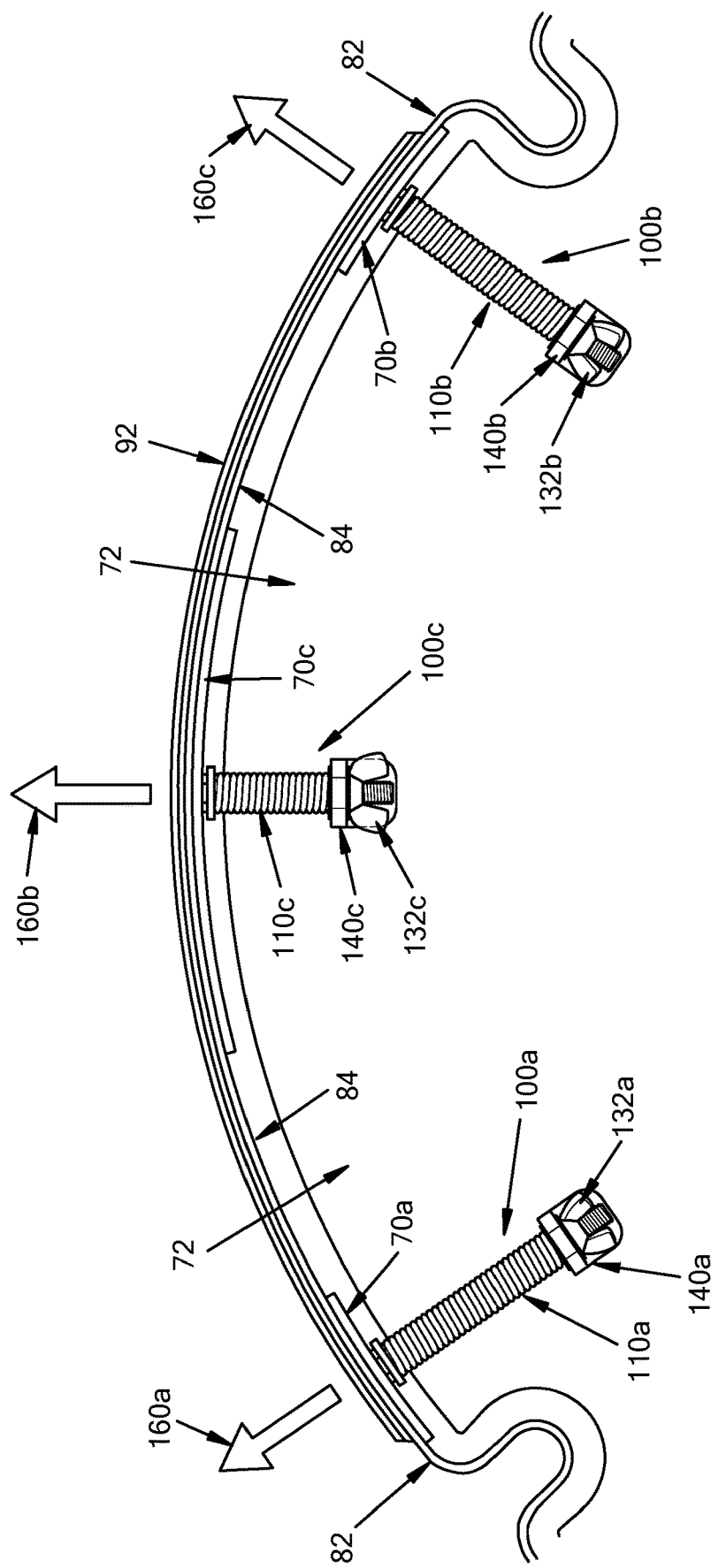
FIG. 14 shows an example sector of elevator cabin seal according to one or more embodiments of the present disclosure.

FIG. 14 shows an example sector 92 of elevator cabin seal 50. Sector 92 comprises a plurality of adjustment members 100 such as a first adjustment member 100a, a second adjustment member 100b, and a third adjustment member 100c. Each adjustment member 100 is coupled to plate interior surface 72 via bracket 140. For example, bracket 140a is coupled to plate interior surface 72 and to adjustment member 100a. Bracket 140b is coupled to plate interior surface 72 and to adjustment member 100b. Bracket 140c is coupled to plate interior surface 72 and to adjustment member 100c. Each adjustment member 100 comprises nut 132 (e.g., one of corresponding nuts 132a, 132b, 132c), spring 110 (one of corresponding springs 110a, 110b, 110c), and push plate 120 (one of corresponding push plates 70a, 70b, 70c). Each adjustment member 100 may be adjusted (e.g., by fastening nut 132) to cause push plate 120 to exert force 160 on seal member interior surface 84 (and transferred to seal member exterior surface 82). Different adjustments and/or forces can be provided by each adjustment member 100. For example, first adjustment member 100a may provide a first force 160a, second adjustment member 100b may provide a second force 160b, and third adjustment member 100c may provide a third force 160c. Forces 160a, 160b, 160c are referred to herein as "force 160". In other words, individual adjustments and/or forces may be provided per portions of the sector 92 which may be based on characteristics of the components of each adjustment member 100 such as size, material, surface type and shape of push plate 120, characteristics of spring 110, bolt 102, nut 132, etc.

In some embodiments, adjustment members 100a, 100b are referred to as edge adjustment members (or edge spring-loaded adjusting mechanisms) as each provide adjustable sealing features at least to an edge of sector 92. In some other embodiments, adjustment member 100c is referred to as middle adjustment member (or middle spring-loaded adjusting mechanism) as it provides adjustable sealing features at least to a middle portion of sector 92. In some embodiments, the push plate surface 126 of the first, second, and third adjustment members 100a, 100b, 100c have a first contact area, a second contact area, and a third contact area. In some other embodiments, spring 110 of the first, second, and third adjustment members 100a, 100b, 100c may have a first constant factor, a second constant factor, and a third constant factor, respectively. Each constant factor may refer to a spring constant associated with one or more characteristics of spring 110. In some embodiments, the bolt of the first, second, and third adjustment members may have a first bolt length, a second bolt length, and a third bolt length, respectively.

In some embodiments, one or more brackets 140 are L-shaped brackets which may be welded to plate 60 (e.g., ceiling plate) such as to serve as a support platform for a spring-loaded screw (i.e., bolts 102 and spring 110). The bolt head 104 may be welded to push plate 120. Push plate 120 may contact and/or attached to a material layer (e.g., corduroy cloth) that wraps both the seal member 80 (e.g., seal) and the push plate 120. In some other embodiments, there are two types of springs 110 and bolts 102. In some embodiments, the selection of the types of springs 110 and bolts 102 may be based on adjustability parameters associated with the force exerted to expand and contract the elevator cabin seal 50. In some other embodiments, the selection of the types of springs 110 and bolts 102 may be to account for characteristics of frame 150 (e.g., the structural bars of the ceiling of cabin 14).

In some embodiments, the push plates 120 used in the middle of sectors 92 are longer (than other push plates 120), thereby allowing a larger surface area for pushing and retracting the elevator cabin seal 50 (and/or seal member 80). In some other embodiments, the adjustment member 100 associated with the middle portion of sector 92 comprises a bolt 102 having a 65 mm length and a spring 110 having a 63.5 mm length (e.g., at rest, when not compressed/extended, etc.). In some other embodiments, the push plates 120 used in the edges of sectors 92 are smaller (than other push plates 120) and are arranged to level out the curvature of the seal member 80 when the push plate 120 of the adjustment member in the middle is pushed out. In some embodiments, the adjustment member 100 associated with the edge portion of sector 92 comprises a bolt 102 having a 110 mm length and a spring 110 having a 107.5 mm length (e.g., at rest, when not compressed/extended, etc.). In some other embodiments, the longer bolt 102 and spring 110 is used due to the position of the ceiling's structural bars of frame 150 (e.g., as shown in FIG. 14).

In some embodiments, the L-shaped brackets 140 are welded to plate 60. A washer 128 is fixed onto either side of bracket 140. A bolt 102 equipped with a washer 128 and the respective spring 110 is passed through the circular extrusion (i.e., opening) in the bracket 140. Several types of bolts may be used (e.g., depending on whether the adjustment member is being used in an edge or middle portion of sector 92. A nut 132 (e.g., butterfly nut) may be used to tighten and loosen the spring-loaded bolt 102. As the bolt 102 tightens, spring 110 is compressed. When the bolt 102 loosens, spring 110 expands. The tension applied on the spring 110 is determined by how much the elevator cabin seal 50 (and/or seal member 80) is to be adjusted, i.e., whether the elevator cabin seal 50 (and/or seal member 80) is to be pushed into the elevator walls 12 (e.g., polycarbonate) or retracted away from the elevator walls 12.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An elevator cabin seal for an elevator, the elevator cabin seal comprising:
   a plate having a plate interior surface;
   a seal member having a seal member interior surface and a seal member top surface contiguous with the seal member interior surface, the seal member top surface being coupled to the plate interior surface; and
   a plurality of adjustment members, each adjustment member of the plurality of adjustment members being coupled to the plate interior surface and contacting the seal member interior surface to exert an adjustable force against the seal member interior surface,
   wherein the elevator cabin seal further comprises a plurality of brackets, each bracket of the plurality of brackets being coupled to the plate interior surface, and each adjustment member of the plurality of adjustment members being coupled to the plate interior surface via a corresponding bracket of the plurality of brackets, and
   wherein each bracket comprises a bracket opening, and each adjustable member of the plurality of adjustable members comprises:
   a nut having a nut opening with a nut threaded portion;
   a spring having a first spring end, a second spring end opposite the first spring end, and a spring interior;
   a bolt having a bolt head, a bolt tail, and a bolt threaded portion extending from the bolt tail toward the bolt head, the bolt being inserted through the spring interior and the bracket opening, the first spring end being in contact with the bolt head, the second spring end being in contact with the nut, the nut being arranged to receive at least a section of the bolt threaded portion via the nut threaded portion; and
   a push plate having a first push plate surface and a second push plate surface opposite to the first push plate surface, the push plate being arranged to receive and contact the bolt head on the first push plate surface, the second push plate surface being in contact with the seal member interior surface.

2. The elevator cabin seal of claim 1, wherein each adjustment member further comprises a first washer, a second washer, and a third washer, the bolt being inserted through the first, second, and third washers, the first washer being positioned between the spring first end and the bolt head, the second and second washers being positioned between the spring second end and the nut.

3. The elevator cabin seal of claim 1, wherein the bolt head has a bolt head shape, and the push plate comprises a push plate cavity shaped to conform to the bolt head shape and arranged to receive the bolt head.

4. The elevator cabin seal of claim 1, wherein the adjustable force is adjustable from a first force value to a second force value different from the second force value, and each adjustment member adjustably exerting the adjustable force against the seal member interior surface by tightening or loosening the nut, the tightening of the nut causing the adjustable member to change the adjustable force from the first force value to the second force value.

5. The elevator cabin seal of claim 1, wherein the seal member comprises a plurality of seal member sections, each seal member section comprises a first edge section, a second edge section, and a middle section, and the plurality of adjustment members comprises a first adjustment member, a second adjustment member, and a third adjustment member, the first adjustment member being positioned and making contact with the first edge section, the second adjustment member being positioned and making contact with the second edge section, the third adjustment member being positioned and making with contact with the middle section.

6. The elevator cabin seal of claim 5, wherein one or more of:
   the second push plate surface of the first, second, and third adjustment members has a first contact area, a second contact area, and a third contact area, respectively;
   the spring of the first, second, and third adjustment members has a first constant factor, a second constant factor, and a third constant factor, respectively; and
   the bolt of the first, second, and third adjustment members has a first bolt length, a second bolt length, and a third bolt length, respectively.

7. An elevator cabin seal for an elevator, the elevator cabin seal comprising:
   a plate having a plate interior surface;
   a seal member having a seal member interior surface and a seal member top surface contiguous with the seal member interior surface, the seal member top surface being coupled to the plate interior surface;
   a plurality of brackets, each bracket of the plurality of brackets being coupled to the plate interior surface; and
   a plurality of adjustment members, each adjustment member of the plurality of adjustment members being coupled to a corresponding bracket of the plurality of brackets and contacting the seal member interior surface to exert an adjustable force against the seal member interior surface,
   wherein each bracket comprises a bracket opening, and each adjustable member of the plurality of adjustable members comprises:
   a nut having a nut opening with a nut threaded portion;

a spring having a first spring end, a second spring end opposite the first spring end, and a spring interior;

a bolt having a bolt head, a bolt tail, and a bolt threaded portion extending from the bolt tail toward the bolt head, the bolt being inserted through the spring interior and the bracket opening, the first spring end being in contact with the bolt head, the second spring end being in contact with the nut, the nut being arranged to receive at least a section of the bolt threaded portion via the nut threaded portion; and a push plate having a first push plate surface and a second push plate surface opposite to the first push plate surface, the push plate being arranged to receive and contact the bolt head on the first push plate surface, the second push plate surface being in contact with the seal member interior surface.

8. The elevator cabin seal of claim 7, wherein each adjustment member further comprises a first washer, a second washer, and a third washer, the bolt being inserted through the first, second, and third washers, the first washer being positioned between the spring first end and the bolt head, the second and second washers being positioned between the spring second end and the nut.

9. The elevator cabin seal of claim 7, wherein the bolt head has a bolt head shape, and the push plate comprises a push plate cavity shaped to conform to the bolt head shape and arranged to receive the bolt head.

10. The elevator cabin seal of claim 7, wherein the adjustable force is adjustable from a first force value to a second force value different from the second force value, and each adjustment member adjustably exerting the adjustable force against the seal member interior surface by tightening or loosening the nut, the tightening of the nut causing the adjustable member to change the adjustable force from the first force value to the second force value.

11. The elevator cabin seal of claim 7, wherein the seal member comprises a plurality of seal member sections, each seal member section comprises a first edge section, a second edge section, and a middle section, and the plurality of adjustment members comprises a first adjustment member, a second adjustment member, and a third adjustment member, the first adjustment member being positioned and making contact with the first edge section, the second adjustment member being positioned and making contact with the second edge section, the third adjustment member being positioned and making with contact with the middle section.

12. The elevator cabin seal of claim 11, wherein the second push plate surface of the first, second, and third adjustment members has a first contact area, a second contact area, and a third contact area, respectively.

13. The elevator cabin seal of claim 11, wherein the spring of the first, second, and third adjustment members has a first constant factor, a second constant factor, and a third constant factor, respectively.

14. The elevator cabin seal of claim 11, wherein the bolt of the first, second, and third adjustment members has a first bolt length, a second bolt length, and a third bolt length, respectively.

\* \* \* \* \*